Oct. 11, 1966  R. A. ROBERGE  3,277,711
ELECTRONIC LIQUID LEVEL INDICATOR
Filed May 24, 1963  2 Sheets-Sheet 1

Rowell A. Roberge,
INVENTOR.
WHANN & McMANIGAL
Attorneys for Applicant

Oct. 11, 1966  R. A. ROBERGE  3,277,711
ELECTRONIC LIQUID LEVEL INDICATOR
Filed May 24, 1963  2 Sheets-Sheet 2

Rowell A. Roberge,
INVENTOR.
WHANN & McMANIGAL
Attorneys for Applicant

United States Patent Office 3,277,711
Patented Oct. 11, 1966

3,277,711
ELECTRONIC LIQUID LEVEL INDICATOR
Rowell A. Roberge, 2449 Gardena Ave., Signal Hill, Calif.
Filed May 24, 1963, Ser. No. 282,921
11 Claims. (Cl. 73—304)

This invention relates generally to measuring instruments and particularly relates to an electronic system for measuring the liquid level in a tank or other liquid container.

Liquid level indicators are generally known in the art. Such indicators find use in the petroleum and chemical industry for measuring the level of a liquid in a tank. Frequently, the tank needs to be pressurized to contain a liquid at a relatively high pressure which may exceed several hundred pounds per square inch. Also, the problem of measuring the liquid level in a tank arises in connection with the fuel tank of a boat, ship or an airplane. The liquid, the level of which is to be measured, may be water, oil or fuel or else a chemical which may be maintained under high pressure and which may be highly corrosive. It may also be desirable to measure the level of a low-temperature liquified gas such as liquid oxygen or hydrogen.

Particularly, in the petroleum industry, liquid level indicators have been devised in the past. Thus, the prior art liquid level indicator consists of a float floating on the liquid and connected to a tape which extends outside of the tank where it is connected to a sprocket. Changes in the liquid level will thus rotate the sprocket which may be used to indicate directly the liquid level. Alternatively, the tape may be used to control a Selsyn generator which then drives a Selsyn motor for indicating the liquid level. This prior art liquid level indicator has the drawback that the specific gravity of the liquid influences the position of the float. Furthermore, the system is essentially mechanical and has the usual disadvantages of a mechanical system such as drag and backlash which prevent an accurate indication of the liquid level.

Another liquid level indicator which has been devised in the past is not subject to changes in output readings due to the variations of the specific gravity of the liquid. In this indicator a plate is disposed in the tank which is lowered into the liquid. In order to measure the liquid level, the plate is moved upwards. When the plate breaks the surface of the liquid, a larger force is needed due to surface tension to move the plate upwards. This change in force is sensed by a torque switch which operates when the plate breaks the liquid surface. In this manner, also an indication of the liquid level can be obtained.

However, these prior art mechanical systems cannot operate when the pressure inside the tank is larger than, for example, 300 pounds per square inch. The mechanical movement must be transmitted from inside the high pressure tank to the outside and hence, as the pressure increases beyond a certain limit, the mechanical connection from inside the tank to the outside cannot be maintained pressure-tight. Also, in the chemical industry there may be a severe corrosion problem depending on the type of liquid to be measured. Mechanical systems are particularly subject to this type of corrosion. Furthermore, the accuracies obtainable with prior art devices are not sufficient for many applications. Generally, the accuracy does not exceed one-sixteenth of an inch. Finally, the price of prior art indicators, the installation cost and the cost of maintenance may be relatively large, thus limiting their applications.

It is accordingly an object of the present invention to provide an electronic system for indicating the level of a liquid in a tank or other container.

Another object of the present invention is to provide an electronic liquid level indicator which will operate regardless of the pressure that must be maintained in the tank and regardless of the corrosive properties of the liquid to be measured.

Another object of the present invention is to provide an indicator of the type referred to which will give an accurate indication of the liquid level over a range of many feet of the liquid and with a very high degree of reproducible accuracy.

Still another object of the present invention is to provide an electronic liquid level indicator which has a low installation cost and a low cost of maintenance and which can be manufactured at a competitive price.

An electronic liquid level indicator in accordance with the present invention includes a fractional wave length antenna disposed in a tank having a liquid level, the level of which is to be measured. Variations of the liquid level will cause a change of the capacitance between the antenna and the walls of the tank or container. In accordance with the present invention, these variations of the antenna parameters are utilized to measure and indicate the liquid level.

To this end, there is provided a radio-frequency generator which may, for example, be a crystal-controlled oscillator. The oscillator is coupled to a tank circuit which is driven by the oscillator. The resonant tank circuit in turn is coupled to the antenna. As a result of changes of the liquid level, the capacitance between the antenna and the tank will vary. The variations of capacitance are caused solely by the changes of the dielectric constant of the materials in the tank and hence are substantially independent of the temperature of the liquid. These changes of reactance are reflected back into the resonant tank circuit and tend to detune it. As the resonant tank circuit is detuned, the current flowing through the crystal-controlled oscillator will also decrease. The decrease of the oscillator current may then be measured to indicate changes of the liquid level.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings, in which:

FIG. 3 is a circuit diagram of a modified electronic liquid level indicator embodying the present invention.

Figure 1:
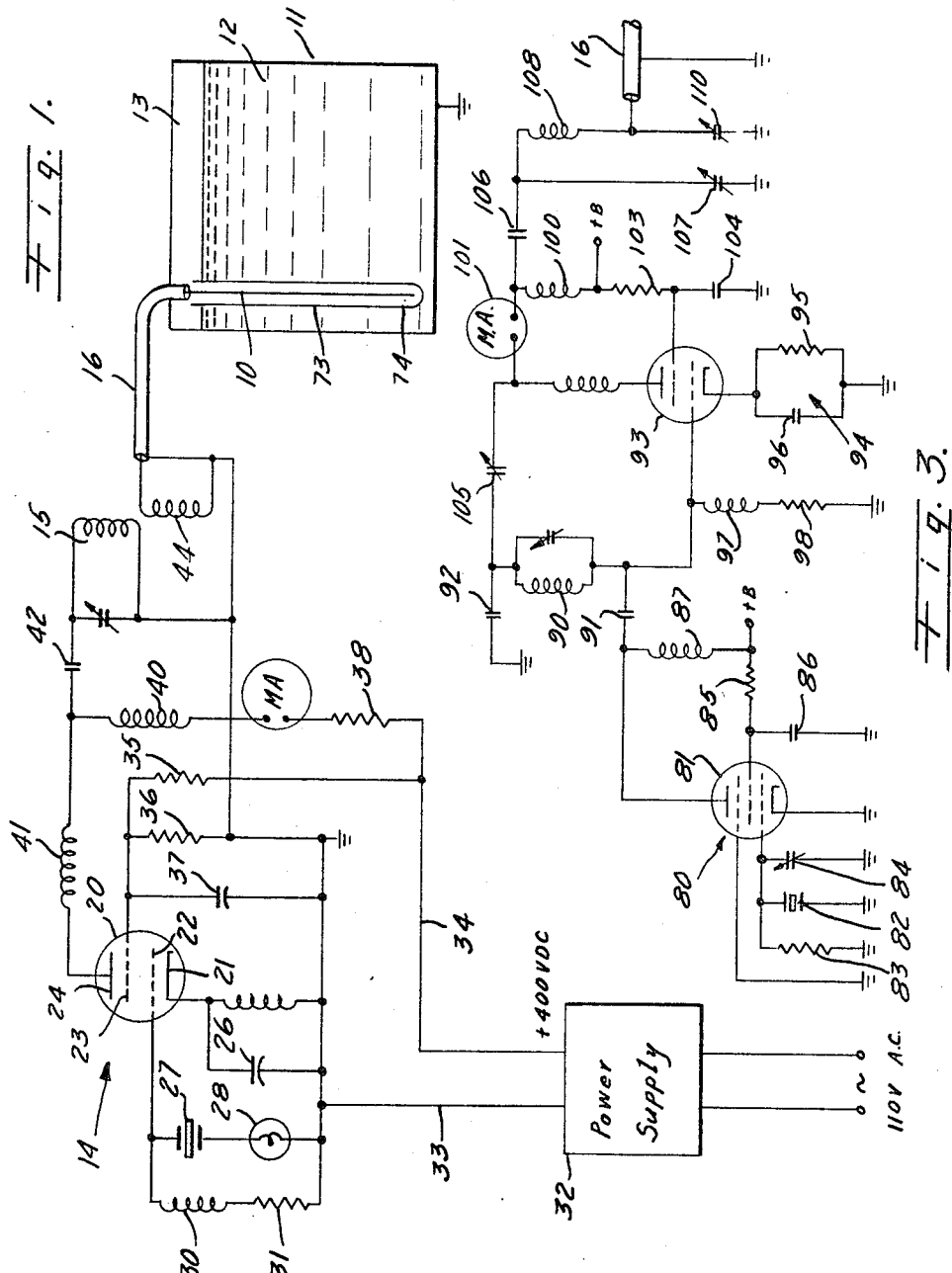
FIG. 1 is a circuit diagram of an electronic system for measuring the level of a liquid in a tank in accordance with the present invention.

Referring now to the drawings and particularly to FIG. 1, there is illustrated an electronic system for measuring and indicating the level of a liquid in a tank. To this end, there is provided an antenna 10 which may be considered a rod antenna or an antenna probe. The antenna 10 is disposed in a tank 11 or other container containing a liquid 12 having a liquid level 13 which is to be measured. The electronic system further comprises a crystal-controlled oscillator 14 coupled to a resonant tank circuit 15 which in turn is coupled to the antenna 10 through a suitable cable 16 which may be a coaxial transmission line. The liquid level 13 may be measured by a readout device 17 such as a milliampere meter as indicated which is responsive to the current flowing through the crystal-controlled oscillator 14.

The crystal-controlled oscillator 14 includes a suitable thermionic tube 20 which may, for example, be a tetrode as shown. The oscillator tube 20 includes a cathode 21, control grid 22, screen grid 23 and plate 24. The cathode 21 may be grounded through a radio-frequency (RF) choke 25 and a capacitor 26 connected in parallel. A piezoelectric crystal 27 is connected between the control grid 22 and ground through a filamentary lamp 28 which operates as a current limiter. However, any other current limiter may be used instead of the lamp 28. The piezoelectric crystal 27 is bypassed to ground through another radio-frequency choke 30 and resistor 31 connected serially between the control grid 22 and ground. A suitable power supply 32 may be energized by 110 volts alternating house current as shown. One of its output leads 33 may be grounded as shown while the other output lead 34 may supply a direct current positive voltage of 400 volts.

The power supply lead 34 is grounded through two resistors 35 and 36 which form a voltage divider network. The junction of resistors 35 and 36 is connected to the screen grid 23. A storage or filter capacitor 37 may be connected between the screen grid 23 and ground to maintain the screen grid at a substantially constant potential. The power supply output lead 34 is also connected to the plate 24 through a resistor 38, the meter 17, a radio-frequency choke 40 and a parasitic choke 41. Thus, the choke coil 40 and resistor 38 form the output load of the crystal-controlled oscillator 14.

A parallel resonant tank circuit 15 is coupled to the junction between chokes 40 and 41 by a coupling capacitor 42. The capacitor of the tank circuit 15 may be adjustable as shown and the lower terminal of the tank circuit 15 may be grounded as indicated.

An inductor 44 is inductively coupled to the tank circuit 15 and may have its lower terminal grounded. The upper terminal of the inductor 44 is connected to the inner conductor of the coaxial cable 16, while the outer conductor of the cable is grounded as shown. The inner conductor of the coaxial cable 16 is in turn connected to the antenna rod 10.

The readout device 17 of the liquid level indicator is responsive to the current flow through resistor 38, which is the current flowing through the oscillator 14. The readout device 17 may be a milliampere meter as shown. Preferably, the meter 17 is of the digital type and may read the output current of the oscillator 14 to four places. These readings may be directly converted into gallons or fractions thereof.

The electronic system of FIG. 1 operates as follows. The oscillator tube 20 will conduct current at a frequency determined by the resonant frequency of the piezoelectric crystal 27. It may be arranged either to operate at the resonant frequency of the piezoelectric crystal or at a harmonic thereof.

The filamentary lamp 28 limits the current through the piezoelectric crystal. The choke coil 30 prevents the RF currents from being grounded. Similarly, the cathode choke coil 25 prevents the RF currents from being directly grounded. The oscillatory energy is coupled by coupling capacitor 42 into the resonant tank circuit 15 which may be considered to be shock excited. The parasitic choke coil 41 will choke parasitic oscillations, that is, oscillations at a harmonic of the fundamental oscillator frequency.

The radio-frequency currents developed across the resonant tank circuit 15 are coupled through inductor 44 and coaxial cable 16 into antenna rod or probe 10. The antenna probe 10 preferably is a fractional wave length antenna, that is, the length of the antenna 10 is a fraction, such as one-fifth of the operating wave length. Such an antenna is a fairly broad-band antenna and will transmit electromagnetic energy over a wide frequency range.

The antenna 10 and the tank 11 jointly are the equivalent of a resonant tank circuit having a resonant frequency which is a function of the dielectric constant of the liquid 12 and its level 13. Thus, as the liquid level changes, the resonant frequency of the system also varies.

At the same time, the change in capacitance between the antenna 10 and the tank 11 caused by the difference of the dielectric constant of the liquid and air 12 is reflected back into the resonant tank circuit 15 and hence tends to change its resonant frequency. As the tank circuit 15 goes out of resonance, the oscillatory currents flowing in the crystal oscillator 14 increase. These variations in current are then measured by the meter 17. Thus, it will be noted that the electronic liquid level indicator of the present invention is responsive to changes of the capacitance caused by the variations of the dielectric constant of the material between the antenna and the tank. As a result, the indicator is not responsive to changes in temperature unless such changes tend to vary the dielectric constant of either the liquid or the gas in the tank 11.

By way of example, the crystal-controlled oscillator 14 may be arranged to develop an output wave having a frequency of between 3 and 6 megacycles. The tank circuit 15 may be adjustable as shown for any particular application. The antenna 10 may, for example, be seven feet long which may represent approximately one-fifth of a wave length for a particular liquid. Preferably, the system is adjusted with the tank 11 free of any liquid. The resonant tank circuit 15 may then be adjusted for optimum operation. For those conditions, the current flowing through the oscillator 14 is a minimum. This current increases with increased detuning of the resonant circuit 15. It is of course also feasible to balance the system with the tank 11 full of liquid, in which case the current through the plate 24 and the meter 17 increases as the liquid level 13 drops. In general, the relationship between the plate current and the liquid level is non-linear because the capacitance decreases as the square of the liquid area.

By way of example, the antenna rod 10 may have a diameter of one-eighth of an inch. Preferably, a metal rod such as a copper rod is first coated with an epoxy resin. Then the rod is wrapped with a Fiberglas or fiber wool tape serving as insulation. This fiber tape is then coated again with epoxy resin. The Fiberglas or cloth lends strength to the metal rod, serves as an insulator and also is chemically rather inert. Thus, such a coated rod may be immersed even in a corrosive liquid.

Where a low surface tension insulator is required, polyethylene may be used instead of the epoxy resin as the outer layer for the antenna. Furthermore, the antenna 10 may be surrounded by a tube 73 such as a glass tube having a suitable aperture 74. The tube 73 serves to stabilize the liquid level about the antenna. While the antenna is located close to one of the walls in FIG. 1, it may also be located in the center of the tank.

It should be pointed out here that the liquid level indicator of the invention may be used to measure any liquid such as water, oil or fuel, various chemicals, including liquified gases at low temperatures such as liquid oxygen. The indicator of the invention may find application in the chemical or petroleum industry and may also be used to determine the fuel level in the fuel tank of a ship, boat or airplane.

Figure 2:
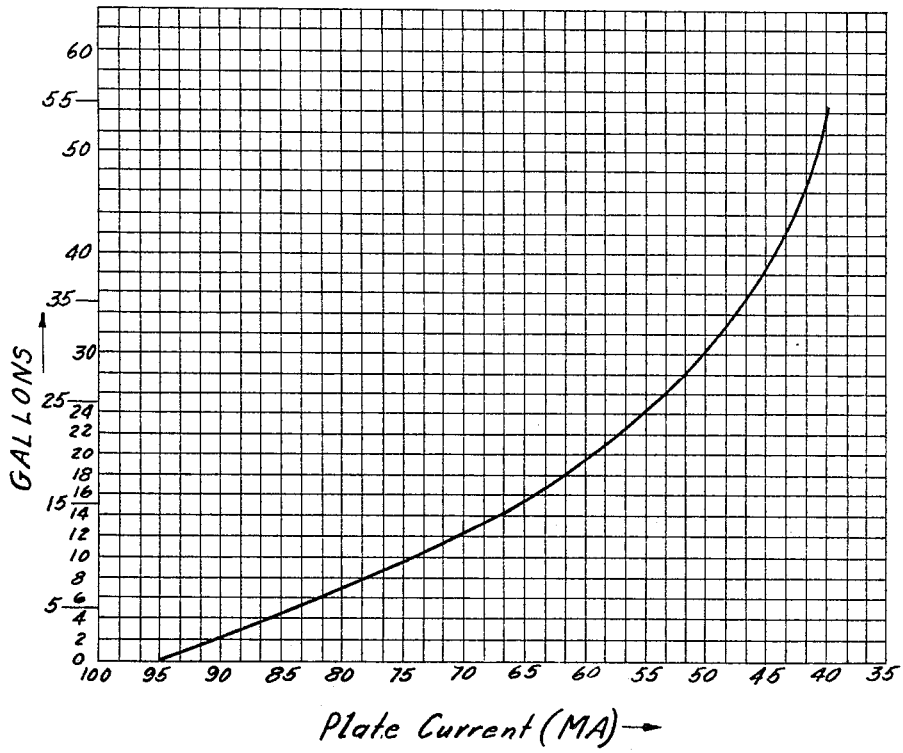
FIG. 2 is a graph showing the relationship between the gallons of liquid contained in a tank as a function of the oscillator plate current and which will be referred to in explaining the operation of the system of FIG. 1.

FIG. 2, to which reference is now made, shows a curve 75 which relates the plate current in milliamperes as measured by meter 17 to the number of gallons in a 55 gallon metal tank. The curve clearly shows that the relationship between the measured gallons and the plate current is non-linear.

While it will be understood that the circuit specifications of the electronic liquid level indicator of FIG. 1 may vary according to the design of any particular application, the following circuit specifications for an indicator are included, by way of example only, suitable for an operating frequency of from three to six megacycles.

| | | |
|---|---|---|
| Tube 20 | Type 6146 tetrode | |
| Capacitor 26 | microfarad | .005 |
| Capacitor 37 | do | .001 |
| Capacitor 42 | do | .01 |
| Resistor 31 | ohms | 27,000 |
| Resistor 36 | do | 40,000 |
| Resistor 35 | do | 20,000 |
| Resistor 38 | do | 5,000 |
| Choke coil 30 | millihenry | 1 |
| Choke coil 41 | do | 0.75 |
| Choke coil 40 | do | 1 |
| Choke coil 25 | do | 1 |

Referring now to FIG. 3, there is illustrated a modified electronic system for measuring the liquid level of a tank. The system of FIG. 3 again includes a crystal-controlled oscillator 80. The oscillator 80 comprises a pentode 81 having its cathode grounded as shown. A piezoelectric crystal 82 is connected between the control grid of tube 81 and ground. Resistor 83 serves as a grid leak resistor while the adjustable capacitor 84 is also connected between the control grid and ground. The screen grid may be grounded as shown while the suppressor grid is supplied with a suitable positive voltage indicated at +B through a resistor 85. The screen grid is bypassed to ground for alternating currents by bypass capacitor 86 which also serves as a filter capacitor to maintain the screen grid at a substantially constant positive voltage. The plate is connected to +B through a radio-frequency choke coil 87 which also serves as the plate load. A parallel resonant tank circuit 90 is coupled to the plate through coupling capacitor 91.

The crystal-controlled oscillator 80 operates in a conventional manner and may be said to shock-excite the tank circuit 90 at its resonant frequency. The tank circuit 90 may have an adjustable capacitor as shown to adjust the operating frequency to an optimum value for any particular application. The upper terminal of the tank circuit 90 may be grounded through a blocking capacitor 92 while the lower terminal of the tank circuit is directly connected to the control grid of a suitable amplifier such as a tetrode 93. The amplifier 93 serves as an isolation or buffer amplifier to isolate the tank circuit 90 of the oscillatory system from the antenna 10 and its tank circuit.

The cathode of tetrode 93 may be grqounded through a bias network 94 consisting of a resistor 95 and a capacitor 96. The control grid is grounded through a choke coil 97 and resistor 98 connected in series as shown. The plate is connected to a suitable positive voltage indicated at +B through a choke coil 100, a milliampere meter 101 and another choke coil 102. The choke 100 serves as the plate load. The screen grid is connected to +B through resistor 103 and is grounded for alternating-frequency currents by bypass capacitor 104. The upper terminal of the oscillatory tank circuit 90 is coupled to choke coil 102 through coupling capacitor 105 which may be adjustable as shown to provide a constant impedance for different resonant frequencies of the tank 90. The plate load 100 is coupled through a coupling capacitor 106 to a parallel resonant circuit including a capacitor 107 and an inductor 108. Capacitor 107 may be adjustable and is connected between the output terminal of capacitor 106 and ground while inductor 108 has its lower terminal connected to the inner conductor of the coaxial line 16 having its outer conductor grounded as shown. The coaxial line 16 may in turn be connected to the antenna 10 as shown in FIG. 1. An adjustable capacitor 110 is connected between the inner conductor of coaxial cable 16 and ground as shown.

The oscillatory currents developed across the oscillator tank circuit 90 are impressed on the control grid of the amplifier 93. Here, the oscillatory currents are amplified and the amplified oscillatory currents are coupled through coupling capacitor 106 into the parallel resonant circuit 107, 108. On the other hand, inductor 108 and capacitor 110 form a series resonant circuit having its junction point connected to the coaxial cable 16 to provide improved impedance matching. Also, the coaxial cable 16 is so designed that it matches the impedance of the antenna rod 10.

It will be obvious that when the frequency of the currents impressed on the antenna are to be adjusted, it is necessary to adjust the oscillator tank circuit 90 as well as the parallel resonant circuit 107 and 108 and the coupling capacitor 105. To this end, the capacitor of resonant circuit 90 and capacitor 107 may be adjusted. At the same time, the capacitor 110 should be adjusted to adjust the frequency of the series resonant circuit 108, 110. Furthermore, the coupling capacitor 105 between the tank circuit 90 and the amplifier 93, may be made adjustable as shown.

The change in plate current which is caused by a change of the dielectric constant about the antenna 10 may be measured again by the milliampere meter 101. Alternatively, it will be appreciated that any other conventional readout device may be utilized. It is of course possible to calibrate the current flowing through the meter 101 in terms of liquid level or in terms of gallons or barrels.

The circuit specifications of the electronic liquid level indicator of FIG. 3 suitable for an operating frequency of from three to six megacycles may be as follows:

| | | |
|---|---|---|
| Tube 81 | 6AG7 type pentode | |
| Tube 93 | 6146 type tetrode | |
| Capacitor 84 | microfarads | 3 to 30 |
| Capacitor 86 | do | .01 |
| Capacitor 91 | do | .001 |
| The capacitor of resonant circuit 90 | micromicrofarads | 0 to 100 |
| Capacitor 105 | microfarads | 0 to 3 |
| Capacitor 106 | do | .01 |
| Capacitor 96 | do | .01 |
| Capacitor 104 | do | .001 |
| Capacitor 107 | micromicrofarads | 0 to 100 |
| Capacitor 110 | do | 0 to 400 |
| Capacitor 92 | do | 470 |
| Resistor 83 | ohms | 67,000 |
| Resistor 85 | do | 22,000 |
| Resistor 98 | do | 30,000 |
| Resistor 95 | do | 200 |
| Resistor 103 | do | 20,000 |

There has thus been disclosed an electronic liquid level indicator which requires no moving parts. The indicator of the present invention may be readily installed in any tank or liquid container by simply installing therein the antenna 10 and a leadthrough for the coaxial cable 16. The antenna may be protected from the corrosive action of any liquid and may be coated with a low surface tension insulator. Thus, the indicator will operate with any liquid and regardless of the pressure that must be maintained within the tank. Furthermore, the cost of maintenance and upkeep of the instrument are low, as is the original cost. The readout may be made extremely accurate and reproducible.

The invention and its attendant advantages will be understood from the foregoing description. It will be apparent that various changes may be made in the form, construction and arrangement of the parts of the invention without departing from the spirit and scope thereof or sacrificing its material advantages, the arrangement hereinbefore described being merely by way of example. I do not wish to be restricted to the specific form shown or uses mentioned except as defined in the accompanying claims, wherein various portions have been separated for clarity of reading and not for emphasis.

I claim:

1. An electronic system for measuring and indicating the level of a liquid in a tank, said system comprising:

(a) an antenna adapted to be positioned in the tank;

(b) a radio-frequency generator including a resonant circuit coupled to said antenna for exciting said antenna at a wave length which is a multiple of the length thereof, said antenna representing a resonant circuit whose parameters vary with a variation of the level of the liquid in a tank; and (c) means for measuring the variations of the generator current with variations of the liquid in the tank, thereby to obtain an indication of the liquid level.

2. An electronic system for measuring and indicating the level of a liquid in a tank, said system comprising:

(a) an antenna adapted to be positioned in the tank;

(b) a crystal-controlled oscillator including a resonant circuit coupled to said antenna for exciting said antenna at a wave length which is a multiple of the length thereof, said antenna representing a resonant circuit whose parameters vary with a variation of the level of the liquid in a tank; and (c) means for measuring the variations of the oscillator current with variations of the liquid level in the tank, thereby to obtain an indication of the liquid level.

3. An electronic system for measuring the level of a liquid in a tank comprising:

(a) an antenna probe adapted to be positioned in the tank;

(b) a radio-frequency generator;

(c) a resonant circuit coupled to said generator and excited thereby;

(d) cable means for connecting said resonant circuit to said antenna probe, said antenna probe having a length which is a fraction of the wave length of the electromagnetic energy excited in said resonant circuit, whereby a change in the liquid level in the tank causes a change in the capacitance between said antenna probe and the tank which is reflected into said resonant circuit and causes in turn a change in the current developed by said generator; and (e) means for measuring the change of the current developed by said generator to measure the liquid level.

4. An electronic system for measuring the level of a liquid in a tank comprising:

(a) an antenna probe adapted to be positioned in the tank;

(b) a crystal-controlled oscillator;

(c) a resonant circuit coupled to said oscillator and excited thereby, (d) cable means for connecting said resonant circuit to said antenna probe, said antenna probe having a length which is a fraction of the wave length of the electromagnetic energy excited in said resonant circuit, whereby a change in the liquid level in the tank causes a change in the capacitance between said antenna probe and the tank which is reflected into said resonant circuit and causes in turn a change in the current developed by said oscillator; and (e) means for measuring the change of the current developed by said oscillator to measure the liquid level.

5. An electronic system for measuring and indicating the level of a liquid in a tank, said system comprising:

(a) an antenna adapted to be positioned in the tank;

(b) a crystal-controlled oscillator;

(c) a buffer amplifier coupled to said oscillator;

(d) a resonant circuit coupled between said buffer amplifier and said antenna for exciting said antenna at a wave length which is a multiple of the length thereof, said antenna representing a resonant circuit whose parameters vary with a variation of the level of the liquid in a tank; and (e) means for measuring the variations of the amplifier current with variations of the liquid level in the tank, thereby to obtain an indication of the liquid level.

6. An electronic system for measuring the level of a liquid in a tank comprising:

(a) an antenna probe adapted to be positioned in the tank;

(b) a crystal-controlled oscillator;

(c) a buffer amplifier coupled to said oscillator;

(d) a resonant circuit coupled to said amplifier and excited thereby;

(e) cable means for connecting said resonant circuit to said antenna probe, said antenna probe having a length which is a fraction of the wave length of the electromagnetic energy excited in said resonant circuit, whereby a change in the liquid level in the tank causes a change in the capacitance between said antenna probe and the tank which is reflected into said resonant circuit and causes in turn a change in the current development by said generator; and (f) means for measuring the change of the current developed by said amplifier to measure the liquid level.

7. An electronic system for measuring the level of a liquid in a tank, said system comprising:

(a) an antenna adapted to be positioned in the tank;

(b) a crystal-controlled oscillator including a thermionic tube having a plate;

(c) a resonant circuit coupled to said oscillator and excited thereby, said resonant circuit being coupled to said antenna for exciting said antenna at a wave length which is a multiple of the length thereof; and (d) means for measuring the variations of said plate current to indicate the liquid level in the tank.

8. An electronic system for measuring the level of a liquid in a tank comprising:

(a) an antenna probe adapted to be positioned in the tank;

(b) a crystal-controlled oscillator including a thermionic tube having a plate;

(c) a resonant circuit coupled to said oscillator and excited thereby;

(d) cable means for connecting said resonant circuit to said antenna probe, said antenna probe having a length which is a fraction of the wave length of the electromagnetic energy excited in said resonant circuit, whereby a change in the liquid level in the tank causes a change in the capacitance between said antenna probe and the tank which is reflected into said resonant circuit and causes in turn a change in the plate current of said oscillator; and (e) means for measuring the change of said plate current to indicate the liquid level.

9. An electronic system for measuring and indicating the level of a liquid in a tank, said system comprising:

(a) an antenna adapted to be positioned in the tank;

(b) a crystal-controlled oscillator;

(c) a first resonant circuit coupled to said oscillator;

(d) a buffer amplifier coupled to said first resonant circuit;

(e) a second resonant circuit coupled between said buffer amplifier and said antenna for exciting said antenna at a wave length which is a multiple of the length thereof, said antenna representing a resonant circuit whose parameters vary with a variation of the level of the liquid in a tank; and (f) means for measuring the variations of the amplifier current with variations of the liquid level in the tank, thereby to obtain an indication of the liquid level.

10. An electronic system for measuring the level of a liquid in a tank comprising:

(a) an antenna probe adapted to be positioned in the tank;

(b) a crystal-controlled oscillator;

(c) a first resonant circuit coupled to said oscillator;

(d) a buffer amplifier coupled to said first resonant circuit;

(e) a second resonant circuit coupled to said amplifier and excited thereby;

(f) cable means for connecting said second resonant circuit to said antenna probe, said antenna probe having a length which is a fraction of the wave length of the electromagnetic energy excited in said resonant circuits, whereby a change in the liquid level in the tank causes a change in the capacitance between said antenna probe and the tank which is reflected into said second resonant circuit and causes in turn a change in the current developed by said generator; and (g) for measuring the change of the current developed by said amplifier to measure the liquid level.

11. An electronic system for measuring the level of a liquid in a tank comprising:

(a) an antenna probe adapted to be positioned in the tank;

(b) a crystal-controlled oscillator;

(c) a first resonant circuit coupled to said oscillator;

(d) a buffer amplifier coupled to said first resonant circuit;

(e) a second parallel resonant circuit coupled to said amplifier and excited thereby;

(f) a coaxial cable for connecting said resonant circuit to said antenna probe, said antenna probe having a length which is a fraction of the wave length of the electromagnetic energy excited in said resonant circuit, whereby a change in the liquid level in the tank causes a change in the capacitance between said antenna probe and the tank which is reflected into said resonant circuit and causes in turn a change in the current developed by said generator;

(g) circuit means coupled to said second parallel resonant circuit for matching the impedance between said second resonant circuit and said coaxial cable; and (h) means for measuring the change of the current developed by said amplifier to measure the liquid level.

References Cited by the Examiner
UNITED STATES PATENTS

| | | | |
|---|---|---|---|
| 2,300,562 | 11/1942 | Freystedt | 73—304 |
| 2,742,609 | 4/1956 | Black et al. | 73—304 |
| 2,852,739 | 9/1958 | Hansen. | |

LOUIS R. PRINCE, *Primary Examiner.*

D. McGIEHAN, *Assistant Examiner.*